(12) United States Patent
Eastty et al.

(10) Patent No.: US 7,092,540 B2
(45) Date of Patent: Aug. 15, 2006

(54) AUTOMATION OF SIGNAL PROCESSING APPARATUS (75) Inventors: Peter Charles Eastty, Oxford (GB); William Edmund Cranstoun Kentish, Chipping Norton (GB)

(73) Assignees: Sony Corporation, Tokyo (JP); Sony United Kingdom Limited, Weybridge (GB)

( * ) Notice: Subject to any disclaimer, the term of this patent is extended or adjusted under 35 U.S.C. 154(b) by 961 days.

(21) Appl. No.: 09/911,584

(22) Filed: Jul. 24, 2001

(65) Prior Publication Data

US 2001/0044666 A1 Nov. 22, 2001

Related U.S. Application Data (63) Continuation of application No. 08/586,094, filed on Jan. 16, 1996.

(30) Foreign Application Priority Data

Mar. 28, 1995 (GB) ................. 9506346.7

(51) Int. Cl.
*H04B 1/00* (2006.01)
(52) U.S. Cl. ...................................... 381/119
(58) Field of Classification Search ................. 381/119
See application file for complete search history.

(56) References Cited

U.S. PATENT DOCUMENTS

| 4,380,029 | A |   | 4/1983  | Bode             |         |
|-----------|---|---|---------|------------------|---------|
| 4,835,626 | A |   | 5/1989  | Wilkinson et al. |         |
| 4,879,751 | A | * | 11/1989 | Franks et al.    | 381/119 |
| 5,060,068 | A |   | 10/1991 | Lindstrom        |         |
| 5,133,081 | A |   | 7/1992  | Mayo             |         |
| 5,293,102 | A |   | 3/1994  | Martinson et al. |         |
| 5,402,501 | A | * | 3/1995  | Silfvajt et al.  | 381/119 |
| 5,487,067 | A | * | 1/1996  | Matsushige       | 370/460 |
| 5,623,551 | A | * | 4/1997  | East et al.      | 381/119 |
| 5,680,639 | A |   | 10/1997 | Milne et al.     |         |

FOREIGN PATENT DOCUMENTS

| EP | 0 039 997 | 11/1981 |
| EP | 0 251 646 | 1/1988  |
| EP | 0 257 813 | 3/1988  |
| EP | 0 291 549 | 11/1988 |
| EP | 0 394 939 | 10/1990 |
| EP | 0 405 939 | 1/1991  |
| EP | 0 595 619 | 5/1994  |

(Continued)

*Primary Examiner*—Brian T. Pendleton
(74) *Attorney, Agent, or Firm*—Frommer Lawrence & Haug LLP; William S. Frommer; Thomas F. Presson (57) ABSTRACT Process for accurately timed automatic alteration of electrical signals stored on a signal carrier (1) during the transmission of the original signal to a signal receiver (8, 10) in which process, for the exact dynamic alteration of the original signals, the original signals are first digitized and, provided with a time code, supplied to a computer (15) and stored in its memory unit, then the original signals digitally stored in the computer (15) are processed independently of the original recording in that the original signals digitally stored in the computer are graphically represented and checked for spots which are to be altered, and the correction signals corresponding to the desired alterations are selected and, provided with a time code, are entered in the computer (15) and then these correction signals are synchronously supplied to the setting members (20) during the transmission of the original signals from the signal carrier (1) to the signal receiver (8, 10).

12 Claims, 7 Drawing Sheets

FOREIGN PATENT DOCUMENTS

| | | |
|---|---|---|
| EP | 0 600 224 | 6/1994 |
| GB | 1 258 601 | 12/1971 |
| GB | 1 570 262 | 6/1980 |
| GB | 1 571 218 | 7/1980 |
| GB | 2 115 588 | 9/1983 |
| GB | 2 155 671 | 9/1985 |
| GB | 2 166 571 | 5/1986 |
| GB | 2 243 006 | 10/1991 |
| GB | 2 254 714 | 10/1992 |
| WO | WO 84/01635 | 4/1984 |
| WO | WO 91/15851 | 10/1991 |
| WO | WO 9115851 A2 * | 10/1991 |
| WO | WO 93/03549 | 2/1993 |

* cited by examiner

AUTOMATION OF SIGNAL PROCESSING APPARATUS

This application is a continuation of application Ser. No. 08/586,094 filed Jan. 16, 1996, now pending.

BACKGROUND OF THE INVENTION

1. Field of the Invention

This invention relates to the automation of signal processing apparatus such as, for example, a digital audio mixing console.

2. Description of the Prior Art

In conventional automated audio mixing consoles, the time-dependent operation of the console is synchronized with respect to a single timecode signal. This timecode signal is usually provided by, for example, a tape recorder associated with the console. Items which are synchronized with the timecode signal include the automation of the console control positions, such as the positions of control faders and potentiometers.

It is possible to operate a console to receive audio signals from two or more tape recorders running at different speeds. However, in a conventional console it is then necessary to automate the desk in accordance with the timecode signal from one of the tape recorders only.

SUMMARY OF THE INVENTION

It is an object of the invention to provide signal processing apparatus which alleviates the problems identified above.

This invention provides signal processing apparatus in which at least two sets of automated signal processing functions are controlled by stored automation commands, at times dependent upon at least two respective timecode signals.

The invention recognises that problems can arise with a console receiving signals from at least two sources (e.g. tape recorders) but which is synchronised to only one timecode signal, especially in cases when the replay speed of one of the signal sources is varied. Automated processing operations acting on the signal from one source but which are synchronised to the timecode of the other source can become out of step with the signal to be processed.

The invention addresses this problem by providing signal processing apparatus (e.g. a mixing console) in which subsets of parts or functions of the apparatus are operable in synchronism with respective different timecode signals. In this way, if two or more sources of timecode are used with the console, then each of the time code signals can be associated with a respective set of mixing controls. This means that the mixer controls used in the mixing of the output of a tape recorder are automated in synchronism with the timecode from that source (e.g. tape recorder). If the tape recorder is operated at a slightly different speed, the timing of the automated edit points changes so that the automated operations occur at the appropriate time in the replayed or recorded audio.

Each timecode signal may be associated with a respective source signal supplied to the apparatus.

Preferably the apparatus is an audio mixing console, such as a digital audio mixing console.

Although the apparatus could compare each automation command with a predetermined list of automated operations for each of the timecodes, there is greater flexibility of operation if the timecodes are specified for each individual automation command. To this end, it is preferred that the apparatus comprises means for receiving automation commands, each comprising an automation control command and information specifying one of the timecode signals.

Although the automation commands could be supplied externally, it is preferred that the receiving means comprises means for retrieving automation commands stored on a storage medium.

Preferably the storage medium is a magnetic disk medium, a magnetic tape medium or an optical disk medium.

In addition to the automation commands, it is preferred that the apparatus also comprises means for recording and/or retrieving an automation database on the storage medium, the automation database specifying automation points within the signal processing apparatus on which the stored automation commands were generated.

The stored automation database may advantageously be used later not only to convert the automation data on that storage medium for use on other consoles, but also as a check that automation data being retrieved for use with a particular console was originated on a console of the same or a compatible design.

In order to use the stored automation database as a check that the automation commands are compatible with the apparatus currently retrieving those commands, it is preferred that the apparatus comprises means for comparing the retrieved automation database with an automation database associated with the apparatus, to detect whether the stored automation commands are compatible with the apparatus.

In previous mixing consoles, the automation commands have specified the physical position of particular console controls such as faders or potentiometers. This makes the automation commands specific not only to a particular layout of console but also to the particular fader response laws used to map the position of the faders into control quantities (e.g. gain or filter response characteristics) to be applied to the signal. In order to reduce this specificity, thus allowing easier translation of automation commands from one console to another, in embodiments of the invention it is preferred that the automation commands specify respective control quantities to be applied to a source signal.

This invention also provides signal processing apparatus in which automated signal processing functions are controlled by stored automation commands, the apparatus comprising means, responsive to a detection of an automation command in a current set of automation commands calling a further set of automation commands, for initiating execution of the further set of automation commands. Such apparatus conveniently allows lists or sets of automation commands to be "nested" so that one set can call another set.

This invention also provides signal processing apparatus in which automated signal processing functions are controlled by stored automation commands, the automation commands specifying respective control quantities to be applied to a source signal.

This invention also provides a storage medium on which automation commands for a signal processing apparatus are stored, each stored automation command having associated stored information specifying one of at least two timecode signals.

This invention also provides a storage medium on which automation commands for an automated signal processing apparatus and an automation database is stored, the automation database specifying the automation points within the signal processing apparatus on which the stored automation commands were generated.

This invention also provides a method of translating automation commands generated at a first command rate on a first automated signal processing apparatus into automation commands at a second command rate for use on a second automated signal processing apparatus, the method comprising the steps of:

sample-rate converting the automation commands from the first command rate to the second command rate; and mapping the sample-rate converted automation commands into equivalent commands for use on the second automated signal processing apparatus.

This invention also provides a method of translating automation commands stored on a storage medium and generated on a first automated signal processing apparatus into automation commands' for use on a second automated signal processing apparatus, the storage medium storing an automation database specifying automation points within the first automated signal processing apparatus, the method comprising the steps of:

retrieving the automation database;

comparing the retrieved automation database with a second automation database associated with the second apparatus, to generate a mapping table defining a mapping of the automation commands generated on the first apparatus to automation commands for use on the second apparatus; and translating, in accordance with the mapping table, the stored automation commands into automation commands for use on the second apparatus.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
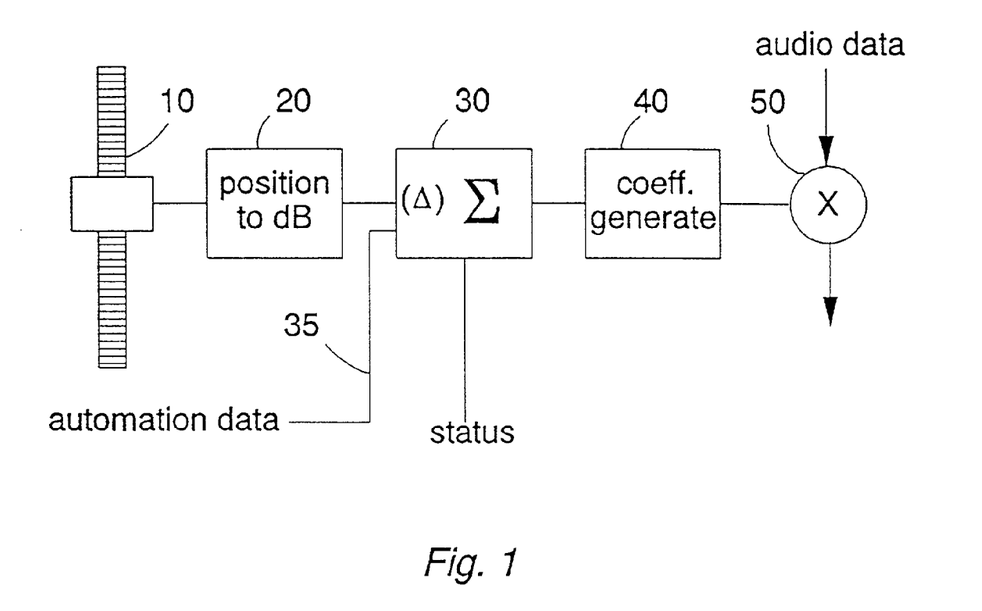
FIG. 1 is a schematic representation of a part of a digital audio mixing console.

Referring now to FIG. 1, a small part of the channel processing for one audio channel of a digital audio mixing console comprises a fader (potentiometer) 10, a unit converting the position of the fader into a control quantity (such as decibels of gain) for processing the audio data of that channel 20, a summation unit 30, a coefficient generator 40 and a multiplier 50.

In operation, a user can specify the gain to be applied to an input audio signal by moving the fader 10. The physical position of the fader is digitised and passed to the position converter 20. The position conversion unit 20 maps the digitised position of the fader 10 onto a corresponding gain value in decibels, to be passed to the summation unit 30.

The summation unit 30 operates under the control of a status signal (which can be set by the user operating a panel control) with the following possible modes of operation:

1) Fully manual operation in which the summation unit simply passes the output of the position conversion unit 20 to the coefficient generator 40;
2) Fully automated operation in which the summation unit 30 passes automation data 35 stored on, for example, an automation tape or disc to the coefficient generator 40. The output of the position converter 20 is not used; and
3) Automated operation with manual override in which the summation unit 30 adds the stored automation data 35 to any detected change ($\Delta$) in the output of the position converter 20. In this way, the automation data 35 is used as a default, but can be overridden by the user moving the fader 10.

The output of the summation unit 30, representing in this example a signal gain in decibels, is then supplied to the coefficient generator 40 which converts that required signal gain into a multiplication coefficient; the input audio data is then multiplied by that multiplication factor in the multiplier 50.

In FIG. 1, the automation data 35 supplied to the summation unit 30 is equivalent in form and meaning to the output of the position converter 20. In other words, the automation data 35 specifies a control quantity (in this example, a gain in decibels; in other examples, the control quantity might define a filter response) to be applied to the signal, rather than merely representing the physical position of a control fader or potentiometer. As described below, this feature makes the transfer of automation data between different consoles much more straightforward.

Figure 2:
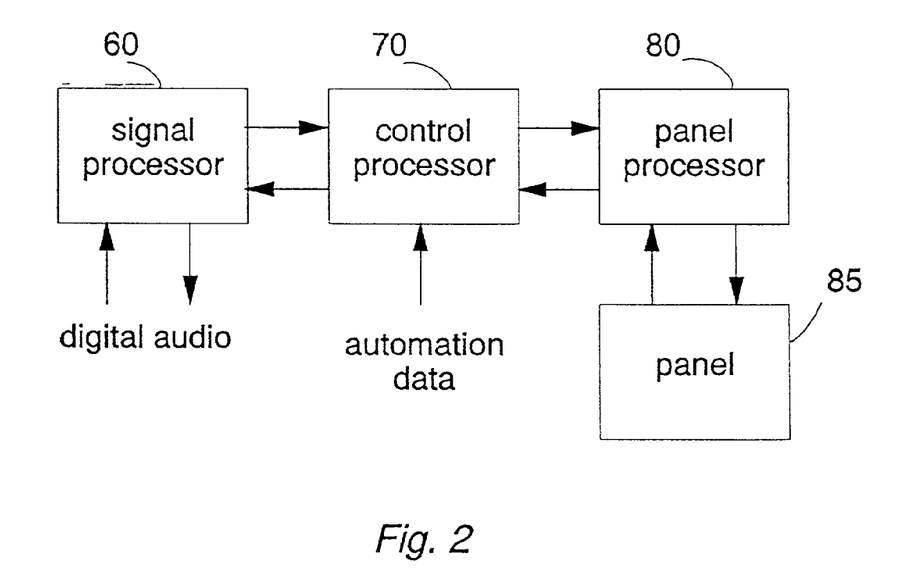
FIG. 2 is a schematic diagram illustrating the processing structure of a digital audio mixing console.

FIG. 2 is a schematic diagram illustrating the processing structure of a digital audio mixing console.

In FIG. 2, the user operates controls on a control panel or desk 85. These controls might be switches, faders, potentiometers and the like. The panel also provides displays of, for example, signal level, signal routing, equalizer operation and the like. A panel processor 80 processes data received from the panel 85 and data to be displayed on the panel 85.

The panel processor is in turn connected to a control processor 70 which receives information from the panel processor indicative of control positions set by the user on the panel, and uses that information to control the operation of a signal processor 60.

The signal processor 60 receives digital audio data and, in response to control information supplied by the control processor 70, performs various multiple filtering and mixing operations on the digital audio data.

Comparing FIGS. 1 and 2, the fader 10 forms part of the panel 80, with the panel processor 80, controlling the digitising of the fader position. The position converter 20, summation unit 30 and coefficient generator 40 are embodied by the control processor 70. Finally, the only part of FIG. 1 which is actually part of the signal path, the multiplier 50, is provided by the signal processor 60.

Accordingly, the automation data 35 supplied to the summation unit 30 in FIG. 1 is actually routed to the control processor 70 in FIG. 2.

Figure 3:
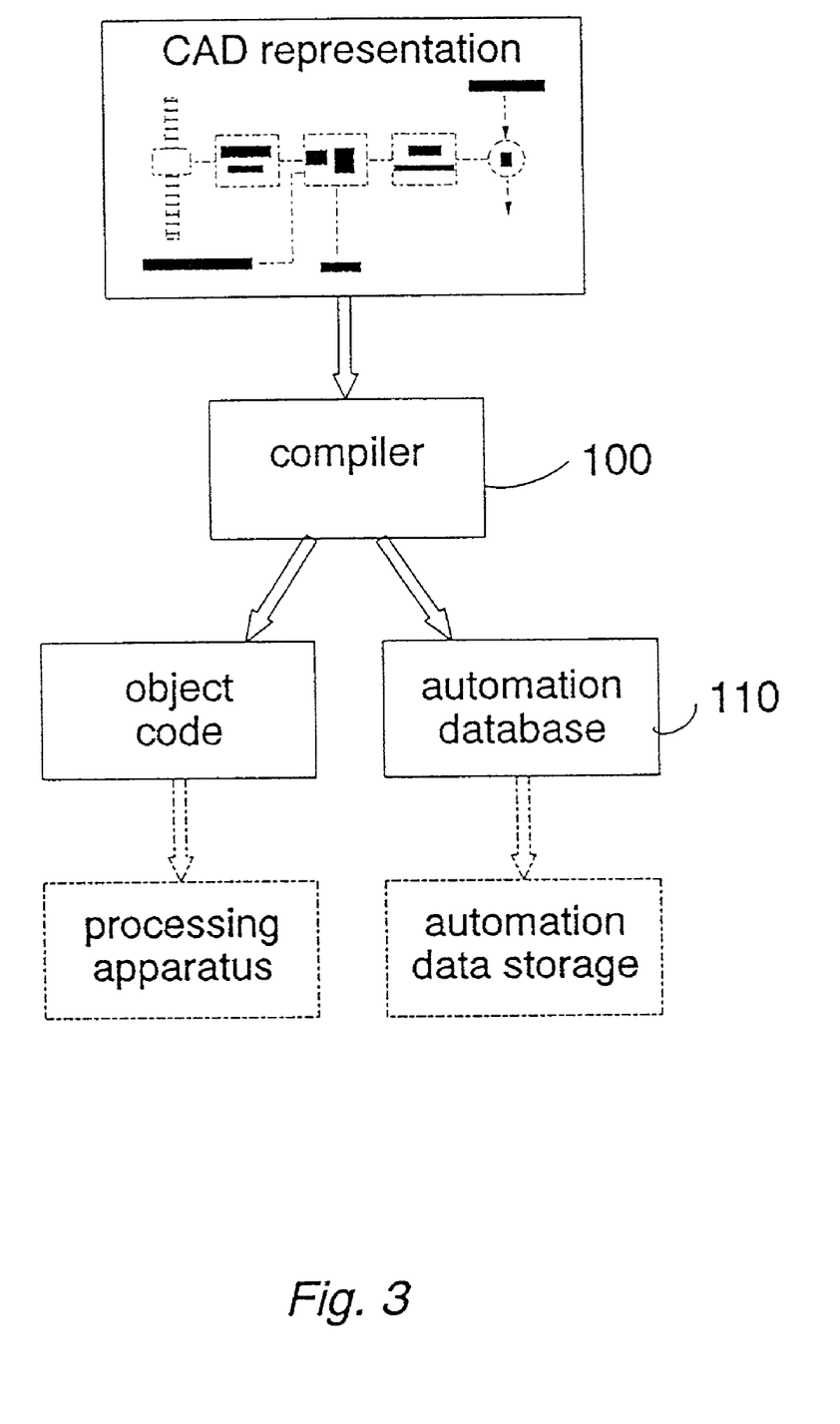
FIG. 3 is a schematic diagram illustrating the generation of object code for use in the digital audio mixing console of FIG. 2.

The control processor 70 and the signal processor 60 are in fact programmable digital data processing devices running suitable object code to provide the functions described above. FIG. 3 is a schematic diagram illustrating the generation of the object code for use in the digital audio mixing console of FIG. 2.

The basic technique for generating suitable object code is described in the following documents, all of which are incorporated herein by reference:

1. "An automated approach to digital console design", W Kentish & C Bell, 81st Audio Engineering Society (AES) Convention preprint, 1986;
2. "Digital audio processing on a grand scale", P Eastty, 81st AES Convention preprint, 1986; and
3. "Automatic generation of microcode for a digital audio signal processor", C McCulloch, 81st AES Convention preprint, 1986.

To summarise the technique described in the above references, a schematic circuit diagram similar in form to that shown in FIG. 1 is set up on a computer-aided design (CAD) system. A netlist is generated from the CAD representation and is then compiled to produce the object code for running on the control processor 70 and the signal processor 80. In FIG. 3, these stages are shown as a single compilation stage 100.

The above process is as described in the three references specified above. A modification of the process in the present embodiment is the generation of an automation database 110. This is a schedule of all of the automation "points" (such as the input to the summation unit 30 in FIG. 1) specified in the CAD representation of a particular digital mixing console. In other words, the automation database 110 provides a list of operations in the mixing console which can be automated. When a set of automation data generated on a particular console is stored on a tape or disc, the automation database for that console is stored on the same medium. This means that the storage medium contains information (the automation database) specifying the system on which that automation data was generated. This can be used later not only to convert the automation data for use on other consoles, but also as a check that automation data being retrieved for use with a particular console was originated on a console of the same design.

In other words, this embodiment allows the production of storage media (magnetic tapes, magnetic or optical disks, electronic memories etc) holding an automation database and a series of automation commands (which may include timecode information as discussed below).

It will be appreciated that the above coding and compilation steps could be performed manually using a known computer programming language.

Figure 4:
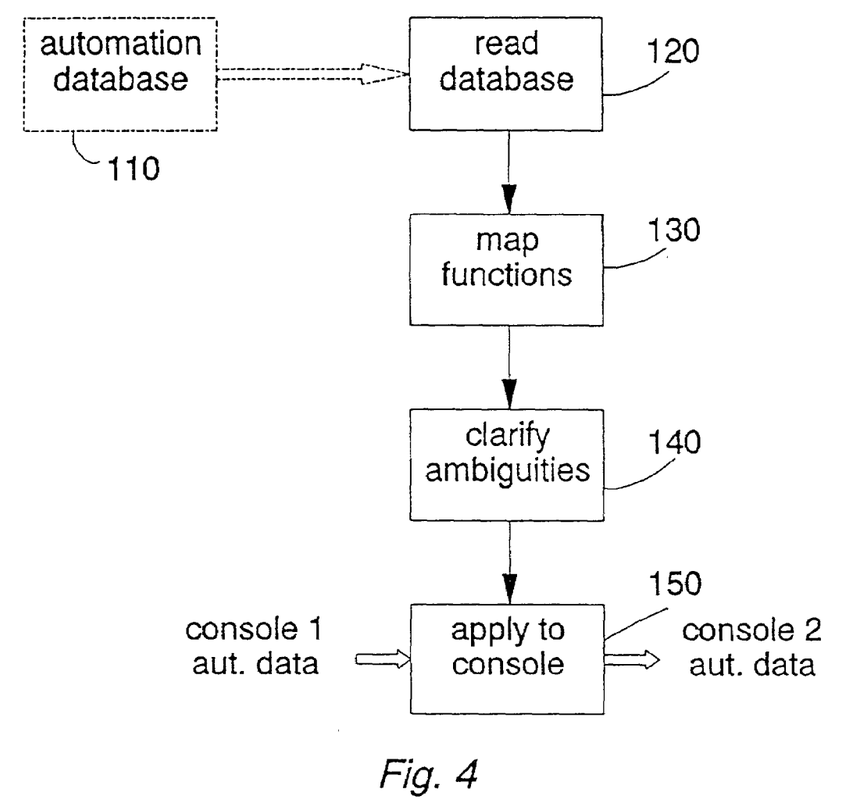
FIG. 4 is a schematic flow chart showing the translation of automation data from one digital audio mixing console to another digital audio mixing console using an automation database.

FIG. 4 is a schematic flowchart showing the translation of automation data from one digital audio mixing console to another similar (but different) console using the automation database. This translation can be performed using, for example, a suitably programmed general purpose computer, or by a suitable program running on a programmable signal processing apparatus.

At a step 120 the automation database 110 is read from the storage medium on which it is provided. The automated functions, such as "channel 1 input gain" are then mapped at a step 130 to identical or corresponding functions in the target mixing console by comparison of the database 110 with the corresponding database for the target console, to generate a mapping or look-up table. If there are any ambiguities, or any functions in the original console which do not map to target functions in the target console, these ambiguities can be clarified at a step 140 by requesting input from the user.

At the end of the step 140, there exists a mapping table which maps each item of possible automation data from the original console (console 1) onto a corresponding function in the target console (console 2). At a step 150, this mapping table is applied to each successive command of the automation data from the original console to generate automation data for the target console.

Figure 5:
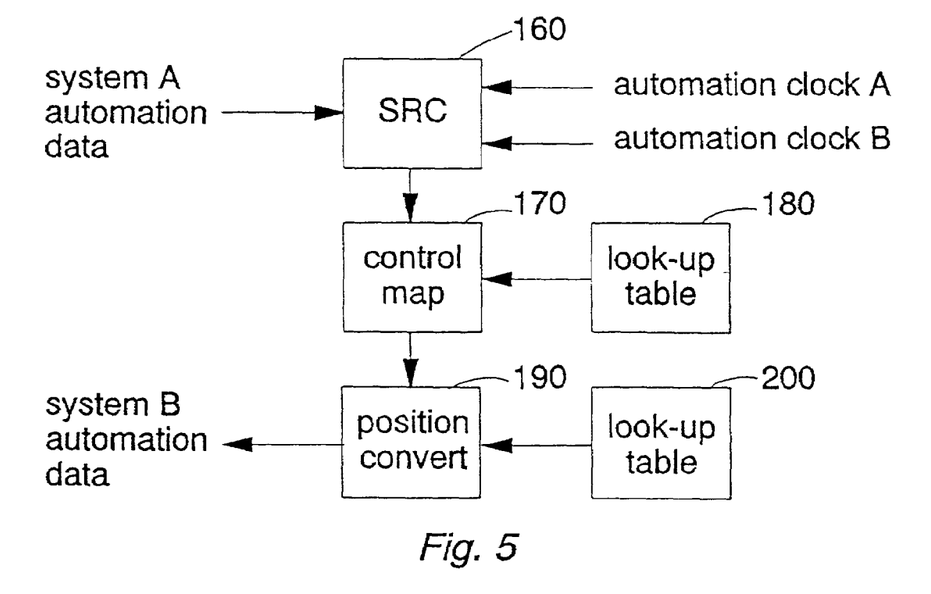
FIG. 5 is a schematic flow chart showing the translation of automation data from one digital audio mixing console to another digital audio mixing console without using an automation database.

FIG. 5 is schematic flowchart showing the translation of automation data from one digital audio mixing console to another digital audio mixing console without using an automation database.

In general, automation data from a particular system refers to sampled control positions at a particular sampling rate (for example, 100 Hz). The first stage, therefore, is sample rate conversion (a step 160) under the control of clock signals defining the sampling rate for automation data in the original and target systems.

At a step 170 the encoding of the control positions, and the resulting effect of those control movements on the processing of the audio signals, are converted to those of the target system using a manually-generated look-up table 180.

Finally, the location of the automated controls on the mixing console must be mapped to the corresponding locations of controls on the target mixing console at a step 190, again using a manually generated look-up table 200.

Figure 6:
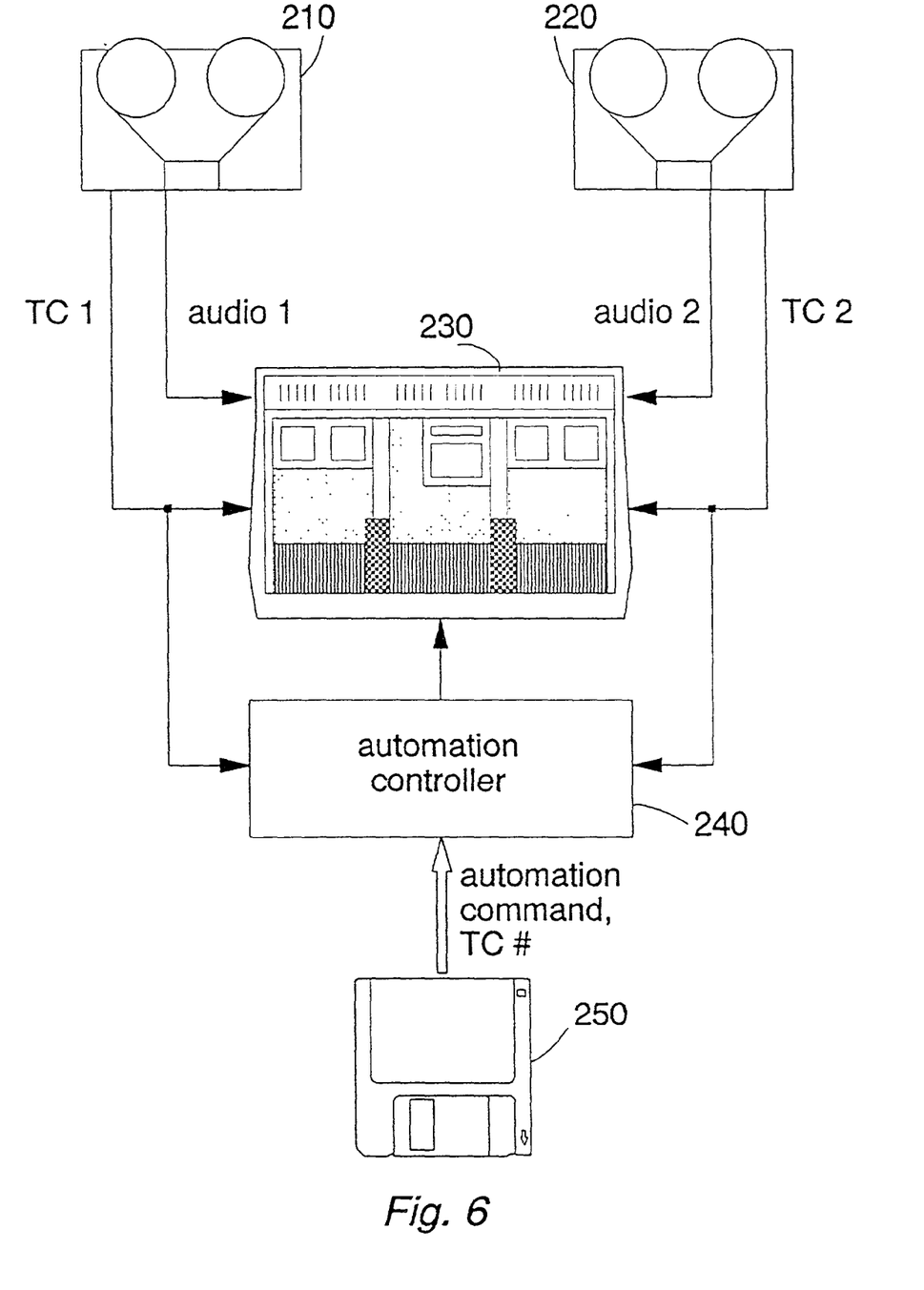
FIG. 6 is a schematic diagram of a digital audio mixing console operating in accordance with more than one timecode signal.

FIG. 6 is a schematic diagram of a digital mixing console operating in accordance with more than one timecode signal.

In conventional audio mixing consoles, the time-dependent operation of the console is synchronised by a single timecode signal. This signal is usually provided by, for example, a tape recorder associated with the console. Items which are synchronised with the timecode signal include the automation of the console controls.

In the apparatus of FIG. 6, two tape recorders 210, 220 are used with a single mixing console 230. Each tape recorder supplies a respective audio signal and a respective timecode signal to the console 230.

The automation of the console 230 is controlled by an automation controller 240, to be described in more detail below. The automation controller 240 receives both of the timecode signals from the two tape recorders and accesses stored automation data from, for example, a floppy disc storage medium 250. The stored automation data is similar to conventional automation data or to automation data described above, except that each automation command has an associated timecode identifying number (TC #).

The automation controller detects the timecode number associated with each automation command, and carries out the operation defined by that command in synchronism with the appropriate one of the timecodes.

Figure 7A:
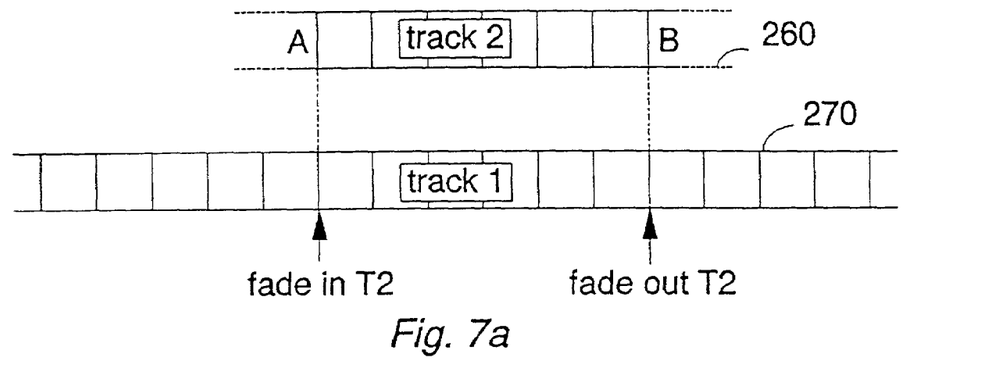
FIGS. 7a to 7c are schematic diagrams of an editing operation showing the use of more than one timecode in the console of FIG. 6.
Figure 7B:
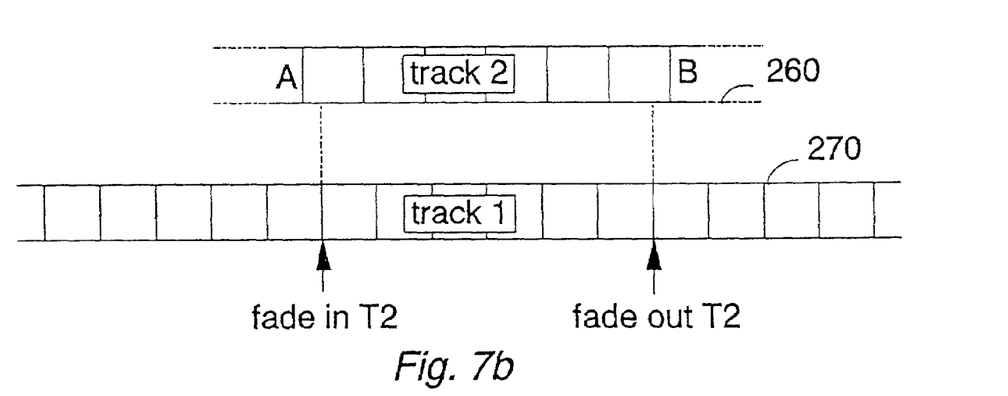
Figure 7C:
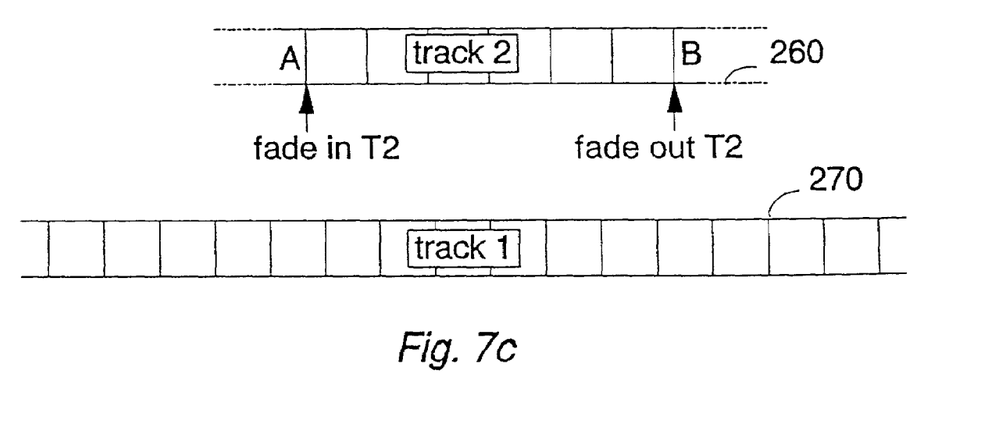

In order to demonstrate a benefit of such a scheme, FIGS. 7*a* to 7*c* are schematic diagrams of an editing operation showing the use of more than one timecode.

Each of FIGS. 7*a* to 7*c* shows one track 260 of the signal replayed from one of the tape recorders 210, 220 being faded into a track 270 replayed from the other of the tape recorders 210, 220. The fade is intended to start at a position A and to end at a position B in the track 260.

In FIG. 7*a*, only one timecode is used to determine the automation of the mixing console, and so the points at which the track 260 is faded in and out are specified with respect to the timecode of the track 270. This can lead to problems if, as shown in FIG. 7b, the relative speeds of the two tape recorders are changed. In FIG. 7b, the track 260 is replayed slightly slower than the track 270, and so the fade in and out points defined with respect to the timecode of the track 270 do not occur at the correct points on the track 260.

In FIG. 7c, the fade in and out points for the track 260 are defined with respect to the timecode associated with that track (260). However, other editing operations relevant to the track 270 are defined with respect to the timecode associated with that track (270). This means that a slight change in relative speed of the different tape recorders does not affect the accuracy of selected cue points or editing operations.

Figure 8:
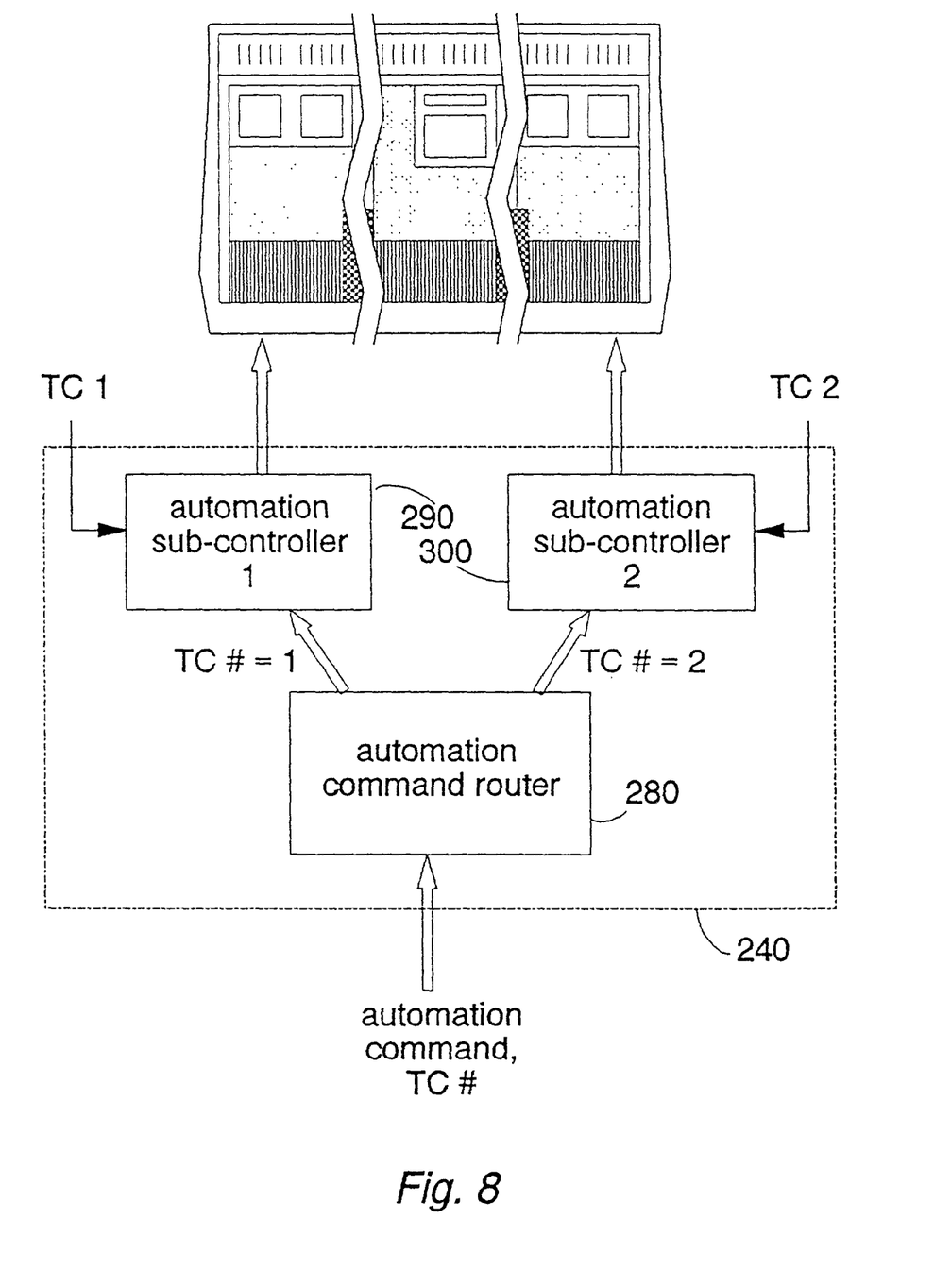
FIG. 8 is a schematic diagram illustrating the operation of the console of FIG. 6 in more detail.

FIG. 8 is a schematic diagram illustrating the operation of the console of FIG. 6 in more detail.

In particular, the automation controller 240 comprises an automation command router 280 and two automation sub-controllers 290, 300. Each of the automation sub-controllers receives one of the timecode signals from a respective tape recorder 210, 220 and controls the operation of respective parts of the mixing console, such that the automated operation of any particular part of the console is controlled by either one or the other of the automation sub-controllers. Apart from the fact that the automation sub-controllers 290, 300 control only a sub-set of the operation of the mixing console, they are otherwise conventional or as described above.

The automation command router 280 receives the automation commands and associated timecode numbers from the storage medium 250. The automation command router 280 then routes automation commands for which the timecode number specifies the timecode of the tape recorder 210 to the automation sub-controller 290. Similarly, where the timecode number specifies the tape recorder 220, commands are routed to the other automation sub-controller 300.

When the automation commands are recorded onto the floppy disk 250, the user indicates which console controls, or alternatively which particular commands, are to be associated with the various timecodes (e.g. TC1, TC2). This can be done simply by selecting particular controls on a screen-driven menu, or by depressing timecode selection switches associated with particular controls or groups of controls. After this selection has been carried out, the automation data is recorded conventionally, except that a short (e.g. one byte) code is appended to (or otherwise associated with) each automation command, to form the timecode identifier for that command.

The systems described above perform automation of the console controls using a single linear series of automation commands known as an edit decision list (EDL). As described above, these commands may be associated with different respective timecode sources, but the EDL is still essentially a serial list of commands to be carried out.

In certain embodiments, however, EDLs can be "nested", so that one EDL can call another EDL and either transfer control to the called EDL or execute commands of the called EDL in parallel with commands of the calling EDL. This feature can be used with or without the multiple timecode operation described above.

Figure 9A:
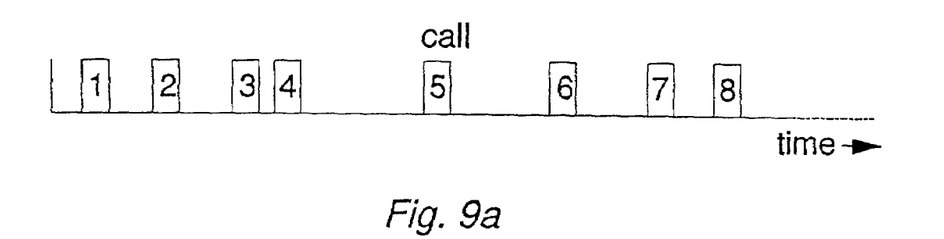
FIGS. 9a to 9c illustrate one edit decision list calling another edit decision list in the console of FIG. 6.
Figure 9B:
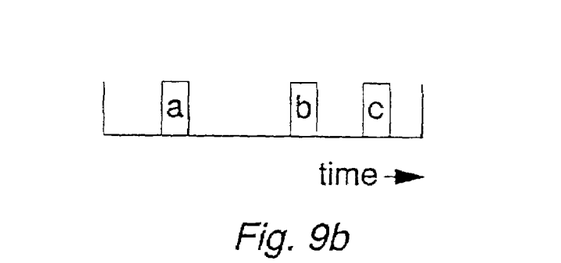
Figure 9C:
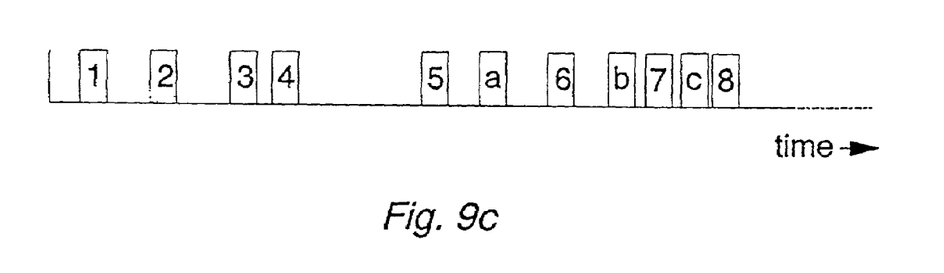

FIGS. 9a to 9c illustrate an example of this process, in which a called EDL is executed in parallel with existing commands of the calling EDL.

In particular, FIG. 9a illustrates an EDL which is read by the automation controller 240 from the floppy disk 150 and stored in a random access memory (not shown) in the automation controller 240. The EDL comprises a series of commands, numbered 1, 2, 3 ... 8 ..., to be executed at respective times. However, one of the commands, command 5, is actually a "call" command, which calls a second EDL illustrated in FIG. 9b. The called EDL comprises only three commands, referred to as commands a, b and c, which have respective times of operation as shown schematically in FIG. 9b.

In order to execute the call, the automation controller 240 reads the EDL of FIG. 9b from the floppy disk 250 and superimposes the commands of the EDL of FIG. 9b onto the EDL of FIG. 9a as held in the random access memory to form a composite EDL as shown in FIG. 9c. Commands of the composite EDL are then executed serially, as normal.

If control is to be transferred to the called EDL, then the automation controller simply has to erase the remaining commands of the calling EDL when the called EDL is loaded into the memory.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A signal processing system in which a set of automation commands are generated, said signal processing apparatus comprising:

a first signal processing apparatus; and a second signal processing apparatus, wherein said set of automation commands are generated based upon a timecode signal and a first set of automated signal processing functions associated with the first signal processing apparatus, said set of automation commands controlling said first signal processing apparatus by invoking said first set of automated signal processing functions, said automation commands also controlling the operation of at least the second signal processing apparatus having a second, different set of automated signal processing functions and using a different timecode signal by similarly invoking said second set of automation signal processing functions, wherein said automation commands specify respective quantities to be applied to a source signal.

2. The system according to claim 1, in which each said timecode signal is associated with a respective source signal supplied to said respective signal processing apparatus.

3. The system according to claim 1, each of said apparatus being an audio mixing console.

4. The system according to claim 1, comprising means for receiving automation commands by said first of said signal processing apparatus, each automation command comprising an automation control command and information specifying said associated timecode signal.

5. The system according to claim 4, in which said receiving means comprises means for retrieving automation commands stored on a storage medium.

6. The system according to claim 5, in which said storage medium is a magnetic disk medium, a magnetic tape medium, or an optical disk medium.

7. The system according to claim 5, comprising means for recording and/or retrieving an automation database on said storage medium, said automation database specifying said automation points within said first signal processing apparatus on which said stored automation commands were generated.

8. The system according to claim 7, comprising means for comparing said retrieved automation database with an automation database comprising automated signal processing functions associated with said second apparatus, to detect whether said stored automation commands are compatible with said second apparatus.

9. A signal processing system in which a set of automation commands are generated, said signal processing apparatus comprising:
- a first signal processing apparatus; and
- a second signal processing apparatus,
- wherein said set of automation commands are generated based upon a timecode signal and a first set of automated signal processing functions associated with the first signal processing apparatus,
- said set of automation commands controlling said first signal processing apparatus by invoking said first set of automated signal processing functions,
- said automation commands also controlling the operation of at least the second signal processing apparatus having a second, different set of automated signal processing functions and using a different timecode signal by similarly invoking said second set of automation signal processing functions, said system comprising:
- means, responsive to a detection of an automation command in a current set of automation commands calling a further set of automation commands, for initiating execution of said further set of automation commands.

10. The system according to claim 1, comprising means for recording automation commands on a storage medium, together with information identifying a respective timecode associated with each automation command.

11. A signal processing system in which a set of automation commands are generated, said signals processing apparatus comprising:
- a first signal processing apparatus:
- a second signal processing apparatus,
- wherein said set of automation commands being generated based upon a timecode signal and a first set of automated signal processing functions associated with the first signal processing apparatus,
- said set of automation commands controlling said first signal processing apparatus by invoking said first set of automated signal processing functions,
- said automation commands also controlling the operation of at lease the second signal processing apparatus having a second, different set of automated signal processing functions and using a different timecode signal by similarly invoking said second set of automation signal processing functions;
- means for receiving automation commands by said first of said signal processing apparatus, each automation command comprising an automation control command and information specifying said associated timecode signal,
- wherein said receiving means comprises means for retrieving automation commands stored on a storage medium; and
- means for recording and/or retrieving an automation database on said storage medium, said automation database specifying said automation points within said first signal processing apparatus on which said stored automation commands were generated.

12. The system according to claim 11, comprising means for comparing said retrieved automation database with an automation database comprising automated signal processing functions associated with said second apparatus, to detect whether said stored automation commands are compatible with said second apparatus.

* * * * *